United States Patent [19]

Headley

[11] Patent Number: 4,554,080

[45] Date of Patent: Nov. 19, 1985

[54] AQUEOUS DRILLING FLUIDS CONTAINING ALKENYL SUCCINIC ANHYDRIDES

[75] Inventor: James A. Headley, Missouri City, Tex.

[73] Assignee: Texaco Inc., White Plains, N.Y.

[21] Appl. No.: 606,111

[22] Filed: May 2, 1984

[51] Int. Cl.$^4$ ............................................... C09K 7/02
[52] U.S. Cl. .............................. 252/8.5 A; 252/8.5 C; 252/49.3
[58] Field of Search ............... 252/8.5 A, 8.5 C, 39, 252/41, 49.3, 49.5

[56] References Cited

U.S. PATENT DOCUMENTS

| | | | |
|---|---|---|---|
| 3,047,493 | 7/1962 | Rosenberg | 252/8.5 |
| 3,231,587 | 1/1966 | Rense | 252/39 X |
| 3,271,310 | 9/1966 | Le Suer | 252/39 X |
| 3,761,410 | 9/1973 | Mondshine et al. | 252/8.5 |
| 4,382,002 | 5/1983 | Walker et al. | 252/8.5 |
| 4,486,324 | 12/1984 | Korosec | 252/49.5 X |

Primary Examiner—Herbert B. Guynn
Attorney, Agent, or Firm—Jack H. Park; Kenneth R. Priem; Harold J. Delhommer

[57] ABSTRACT

Disclosed are novel aqueous drilling fluid compositions containing a lubrication additive and a method of drilling wells wherein the underground formation is contacted with such drilling fluid compositions. The lubrication additive is a polyolefin in aqueous solution having a molecular weight between about 500 and about 2100 with one or more substituent groups of succinic anhydride.

11 Claims, No Drawings

AQUEOUS DRILLING FLUIDS CONTAINING ALKENYL SUCCINIC ANHYDRIDES

BACKGROUND OF THE INVENTION

This invention relates to a novel additive for aqueous drilling fluids and a method for drilling wells in subsurface formations utilizing drilling fluids containing the additive. More particularly, the additive functions as a lubricant to substantially reduce torque in rotating drill stems.

Drilling fluids, or drilling muds as they are sometimes called, are slurries of clay solids used in the drilling of wells in the earth, particularly for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

An ideal drilling fluid is a thixotropic fluid, which is a fluid whose viscosity decreases as the degree of agitation or shear rate increases. Such fluids are desirable to reduce torque on a rotating drill string as well as support and remove formation cuttings from the well. Frequently, these two purposes are difficult to achieve at the same time. Consequently, certain materials are normally added to aqueous drilling muds for lubrication to decrease torque on the drill string.

U.S. Pat. No. 3,410,797 describes the lubricant use of a stannous dithiophosphate and a dibutyltin didecyl dithiophosphate in aqueous drilling muds. Phosphosulfurized olefins for drilling fluid lubricants are also disclosed in U.S. Pat. No. 3,810,836.

Examples of lubricants now used in aqueous drilling fluids include such proprietary materials as Torq-Trim II, a trademarked material sold by NL Baroid; Magcolube, a trademarked lubricant sold by Magcobar; Lubri-Sal, a trademarked additive sold by Milchem Inc.; and SWS, a trademarked lubricant sold by IMCO Services. These prior art additives may be used for lubrication in certain types of aqueous drilling fluids, most notably aqueous lignosulfonate muds. However, in other types of muds, they may be completely inadequate. Other lubrication additives include surfactants which create foaming problems and precipitation problems in hard waters. Polymer beads are sometimes employed to enhance the rotation of the drill bit but are difficult to work with primarily because their large size creates severe separation problems in the recycling of drilling fluids.

Special purpose drilling fluids are used in certain geographical areas where the well must penetrate formations known as heaving or sloughing shales. Aqueous drilling fluids containing hydroxides and other water soluble alkali metal and alkali earth metal salts have been frequently employed for drilling the type of heaving shales encountered in the Gulf Coast region of the United States. These lime based systems cannot be lubricated with the most common additives because the high pH and soluble calcium present in lime base systems render most drilling fluid lubricants ineffective. Fatty acid ester lubricants are hydrolized to fatty acids which precipitate out with calcium.

The additional fact that many Gulf Coast wells are highly deviated increases the need for lubricants to be used with the lime based systems frequently employed with unstable Gulf Coast shales. In deviated wells, greater lubrication is needed because the drill string is more likely to be lying against the side of the borehole. A deviated well also increases the likelihood of shale on the sides of the borehole becoming unstable, which increases the need to use lime based mud systems.

A wide variety of lubrication additives are commercially available for use with high pH lime drilling fluid systems. Only a few of these offer satisfactory torque reductions and most of those that provide substantial lubrication adversely affect the drilling fluid system.

When added to a lime:Mor-Rex system in 2% by volume quantities and tested according to Ex. 1, the trademarked product AZ-32 sold by Petroleum Associates of Lafayette, Inc. offered insignificant torque reductions of 3–4%. Similar results were found with the trademarked additives Lubrisal, Shale Heal and Torque Trim II, sold by Milchem, Gill Industries and NL Baroid, respectively. The trademarked additives G.M.L., ReDou Torque, and SDL-711, sold by Frontier Research, Oil-Base Germany and Superior Chemicals, respectively, yielded modest torque reductions of about 15–23%.

Magcolube, a trademarked product sold by Magcobar, Inc. yielded 22% reduction in torque but caused the drilling fluid to bead up and grease out the barite, an intolerable problem. Finally, E.P. Mud Lube, a trademarked product of NL Baroid caused foaming problems and also caused a greasing problem with the barite.

Accordingly, there is a substantial need for additives for use in aqueous drilling fluids, particularly hydroxide based mud systems, to lubricate the drill string and reduce torque loads.

SUMMARY OF THE INVENTION

The invention includes both aqueous drilling fluid compositions containing the lubrication additive set forth below and a method of drilling wells wherein the formation is contacted with such drilling fluid compositions. It has been discovered that torque on a drill string can be substantially reduced by the employment of aqueous drilling fluids having a pH greater than about 8 containing about 0.2 to about 3.0% by volume of polyolefins having a molecular weight between about 500 and about 2100 with one or more substituents groups of the formula

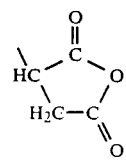

DETAILED DESCRIPTION

The use of aqueous drilling fluids containing a polyolefin chain with the substituent group

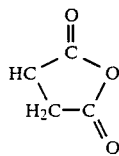

according to the invention can achieve torque reductions in the drill string in the range of about 25 percent to about 60 percent with little or no distortion in the properties of the drilling muds. Because of the lubrication properties of the invention additive and its lack of reactability with drilling muds and their operating environments, the present invention fills a long felt need for an effective lubricant, particularly in sloughing shale environments.

The invention additive preferably is a polybutene chain having a molecular weight between about 900 and about 1700 with one or more substituent groups of succinic anhydride. It can be prepared by reacting maleic anhydride with the polyolefin chain.

The present invention is applicable to any water-based mud system wherein the invention additive is employed in quantities of about 0.2 to about 3.0 volume percent, most preferably about 0.3 to about 2.0 volume percent of drilling fluid. It is particularly applicable to hydroxide based mud systems which render ineffective most lubricating additives. Chief among these systems are those based upon the use of lime and polysaccharide additives such as Mor-Rex, a trademarked group of polysaccharides sold by Grain Processing Corporation. Mor-Rex comprises hydrolyzed cereal solids which are chiefly polysaccharides and is added to aqueous lime drilling fluids to reduce gel strengths and yield points. Lime:Mor-Rex fluid systems are chiefly used in the Gulf Coast area where unstable shale formations exist. The invention also has considerable application to lime:lignosulfonate drilling fluids, lignosulfonate drilling fluid systems, gypsum based fluid systems, saturated sodium chloride brine systems and polymer based non-dispersed fluid systems.

A typical lime:Mor-Rex fluid system according to the invention will contain about 0.2% to about 3.0% by volume of the invention additive, about 1 to about 8 lb/bbl of lime and about ⅛ to about 8 lb/bbl of polysaccharide and a pH greater than about 12.

The invention also encompasses a method of drilling a well wherein an aqueous drilling fluid containing the invention lubrication additive in solution is circulated in the well in contact with the underground formations.

The following examples will further illustrate the novel aqueous drilling fluids of the present invention containing the instant lubrication additive. These examples are given by way of illustration and not as limitations on the scope of the invention. Thus, it should be understood that the composition of the aqueous drilling fluids may be varied to achieve similar results within the scope of the invention.

TABLES 1-3

Various amounts of the alkenyl succinic anhydrides of the present invention were tested in lime:Mor-Rex drilling fluid systems and lignosulfonate fluid systems. The compound tested is sold under the trademark TLA-627 by Texaco Chemical Co. The TLA-627 has a polybutene chain with a molecular weight of about 1300 and the substituent group, succinic anhydride.

Several drilling fluid systems were prepared according to the tables using Aqua Gel, a trademarked bentonite clay of NL Baroid Inc. and Q-Broxin, a trademarked ferrochrome lignosulfonate sold by NL Baroid, Inc.

The lubricant evaluations were performed on a lubrication testing apparatus designed to measure torque on a stainless steel shaft that was rotated in a Verea Sandstone borehole. The shaft-sandstone interface was submerged in a circulating mud system and the shaft was forced by various loads to rub against the sandstone face. Torque measurements were obtained at the various loads both before and after treatment with the lubricant additives. Results were reported as percentage reduction in torque for each load. A desirable result is a substantial reduction in torque (greater than 20%) that is maintained across the range of loads.

Table 1 illustrates the superb results obtained from using TLA-627 as a lubrication additive in lime:Mor-Rex fluids. It can be seen that average torque reductions of 33% to 38% were obtained with treatments of 1.0% to 2.0% by volume of TLA-627. This is an excellent response for low treatment levels. The torque reductions, however, are much greater at lower loads and decrease as the load becomes greater. The TLA-627 is especially efficacious at low loads, offering greater torque reduction than any known lubrication additive. This compares very favorably with torque reductions of 15% to 20% in lime:Mor-Rex fluid systems obtained from the very best of the prior art lubrication additives at prior art treatment levels of 1% to 2% by volume. Furthermore, the prior lubrication additives usually cause undesirable effects on the drilling fluid systems such as greasing out the barite.

Table 2 illustrates torque reductions in a lime:Mor-Rex fluid under slightly different conditions than Table 1. It was discovered that addition of about 2% by volume TLA-627 caused foaming. This was corrected by the addition of an octanol defoamer. Table 3 demonstrates the significant torque reductions available when the additive is employed in a lignosulfonate system, especially at high loads.

TABLES 4-6

In order to determine if the alkenyl succinic anhydrides have any effect on other fluid properties, the materials were added to weighted and unweighted lime:Mor-Rex systems in Tables 4 and 5 and to a lignosulfonate system in Table 6. Generally, all compatibility tests showed virtually no change in fluid properties with the addition of the alkenyl succinic anhydrides. Thus the use of the alkenyl succinic anhydrides in aqueous drilling fluid systems should present no problems in controlling the properties of the fluid systems.

The standard API drilling fluid tests were run according to the procedure recommended by the API and published in *Standard Procedure For Testing Drilling Fluids,* American Petroleum Institute, Washington, D.C. (9th ed. 1982). The tests conducted were plastic viscosity (PV in cp), yield point (YP in lbs/100 ft$^2$), gel strength after sitting for ten seconds and after sitting for ten minutes in lbs/100 ft$^2$ (If the testing tube sinks to the bottom in less than sixty seconds, shear strength is reported as 0 lbs/100 ft$^2$ with a superscript indicating the time in seconds to sink to the bottom.), API fluid loss (in cc/30 min), low temperature low pressure filtrate (LTLP in cc/30 min), phenolphthalein filtrate alkalinity ($P_f$ in cc of 0.02N $H_2SO_4$ per cc of sample to reach the phenolphthalein end point), phenolphthalein mud alkalinity ($P_m$ in cc of 0.02N $H_2SO_4$ per cc of sample to reach the phenolphthalein end point), calcium ion content (mg/liter of filtrate), and chlorine ion content (chlorides in mg/liter of filtrate).

The battery of standard API recommended fluid tests of Tables 4–6 were conducted with the base fluids listed in each table. These contained a native solids, top-hole mud from South Louisiana and other components including a lignite sold under the tradename Carbonox by NL Baroid.

TABLE 1
EVALUATION OF TLA-627 AS A LUBRICANT IN A LIME:MOR-REX FLUID

| LOAD (gms) | UNTREATED | TREATED | TORQUE REDUCTION (%) |
|---|---|---|---|
| | 0.5% by volume | | |
| 500 | 17.3 | 12.1 | 30 |
| 1000 | 30.6 | 23.7 | 23 |
| 1500 | 45.3 | 37.3 | 18 |
| 2000 | 60.3 | 53.1 | 12 |
| | | | AVER. 21 |
| | 1.0% by volume | | |
| 500 | 14.9 | 8.1 | 46 |
| 1000 | 25.3 | 16.2 | 36 |
| 1500 | 37.4 | 25.2 | 32 |
| 2000 | 48.8 | 37.2 | 24 |
| | | | AVER. 35 |
| | 2.0% by volume | | |
| 500 | 15.8 | 9.4 | 40 |
| 1000 | 28.6 | 17.8 | 38 |
| 1500 | 43.0 | 29.6 | 31 |
| 2000 | 57.1 | 45.0 | 21 |
| | | | AVER. 33 |
| | 2.0% by volume | | |
| 500 | 14.7 | 5.9 | 60 |
| 1000 | 26.8 | 15.2 | 43 |
| 1500 | 39.4 | 28.7 | 27 |
| 2000 | 52.7 | 40.8 | 23 |
| | | | AVER. 38 |

BASE:
Aqua Gel: 25 lb/bbl
Lime: 3 lb/bbl
Mor-Rex: 2 lb/bbl
Caustic Soda: 1 lb/bbl

TABLE 2
EVALUATION OF TLA-627 AS A LUBRICANT IN A LIME:MOR-REX FLUID

| LOAD (gms) | UNTREATED | TREATED | TORQUE REDUCTION (%) |
|---|---|---|---|
| | 2.0 by volume TLA-627 | | |
| 500 | 14.5 | 1.1 | 92 |
| 1000 | 27.6 | 7.9 | 71 |
| 1500 | 43.3 | 16.7 | 61 |
| 2000 | 58.3 | 33.7 | 42 |
| | | | AVER. 67 |

*Octanol defoamer added to above after treated 500 gm test.

| | 2.0% by volume TLA-627 | | |
| 500 | 14.3 | 3.0 | 79 |
| 1000 | 25.1 | 7.6 | 70 |
| 1500 | 37.2 | 20.1 | 46 |
| 2000 | 51.6 | 24.1 | 53 |
| | | | AVER. 62 |

*Samples rolled for 16 hours at 150° F. with the TLA-627 before tests.
BASE:
Aqua Gel: 25 lb/bbl
Lime: 3 lb/bbl
Mor-Rex: 2 lb/bbl
Caustic Soda: 1 lb/bbl

TABLE 3
EVALUATION OF TLA-627 AS A LUBRICANT IN A LIGNOSULFONATE FLUID

| LOAD (gms) | UNTREATED | TREATED | TORQUE REDUCTION (%) |
|---|---|---|---|
| | 1.0 by volume TLA-627 | | |
| 500 | 12.9 | 11.0 | 15 |
| 1000 | 19.9 | 17.0 | 15 |
| 1500 | 35.9 | 20.2 | 43 |
| 2000 | 49.8 | 25.3 | 49 |
| | | | AVER. 31 |
| | 2.0% by volume TLA-627 | | |
| 500 | 13.7 | 10.8 | 21 |
| 1000 | 26.8 | 16.6 | 40 |
| 1500 | 39.8 | 20.6 | 47 |
| 2000 | 56.3 | 21.0 | 63 |
| | | | AVER. 43 |

BASE:
Aqua Gel: 25 lb/bbl
Q-Broxin 4 lb/bbl
Caustic Soda to pH 10

TABLE 4
COMPATABILITY TESTING TLA-627 IN LIME:MOR-REX

| Sample | 1 | 2 | 3 | 4 | 5 | 6 |
|---|---|---|---|---|---|---|
| TLA-627 (lbs/bbl) | 0 | 0.5 | 1.0 | 2.0 | 4.0 | 8.0 |
| Plastic Vis. | 37 | 47 | 26 | 25 | 35 | 23 |
| Yield Point | 0 | 0 | 0 | 1 | 0 | 3 |
| Gels | | | | | | |
| 10 sec | $0^1$ | $0^1$ | $0^1$ | $0^1$ | $0^1$ | $0^1$ |
| 10 min | $0^1$ | $0^1$ | $0^1$ | $0^1$ | $0^1$ | $0^1$ |
| API Filtrate | 24.5 | 26.4 | 24.9 | 23.9 | 23.9 | 22.0 |
| $P_M$ | 12.4 | 12.3 | 12.4 | 12.6 | 12.0 | 11.0 |
| $P_f$ | 3.4 | 3.5 | 3.4 | 3.3 | 3.4 | 3.2 |
| Cl | 4440 | 4200 | 4400 | 4100 | 4300 | 4300 |
| Ca | 188 | 124 | 156 | 160 | 168 | 152 |

Base:
Lime 3 lb/bbl.
Mor-Rex: 2 lb/bbl
Caustic: 1 lb/bbl in a native solids mud (Broussard)

TABLE 5
COMPATABILITY TESTING TLA-627 IN LIME:MOR-REX

| Sample | 1 | 2 | 3 | 4 | 5 |
|---|---|---|---|---|---|
| TLA-627 (lbs/bbl) | 0 | 0.5 | 1.0 | 2.0 | 4.0 |
| Plastic Vis. | 27 | 32 | 30 | 27 | 30 |
| Yield Point | 7 | 12 | 7 | 15 | 9 |
| Gels | | | | | |
| 10 sec | $0^3$ | $0^2$ | $0^2$ | $0^2$ | $0^2$ |
| 10 min | $0^{27}$ | $0^{35}$ | 4.0 | 4.0 | 4.0 |
| API Filtrate | 10.0 | 10.5 | 10.3 | 10.3 | 9.7 |
| $P_M$ | 19.7 | 17.5 | 17.0 | 16.5 | 15.9 |
| $P_f$ | 3.1 | 3.1 | 3.1 | 2.9 | 2.7 |
| Cl | 4200 | 4100 | 3600 | 4100 | 4100 |
| Ca | 264 | 288 | 264 | 276 | 300 |

Base:
Lime 6 lb/bbl,
Mor-Rex: 3 lb/bbl
Caustic Soda: 1 lb/bbl
Carbonox: 6 lb/bbl Barite to 16 lb/gal in a native solids mud (Broussard)

TABLE 6
COMPATABILITY TESTING TLA-627 IN LIGNOSULFONATE SYSTEM

| Sample | 1 | 2 | 3 | 4 | 5 | 6 |
|---|---|---|---|---|---|---|
| TLA-627 (lbs/bbl) | 0 | 0.5 | 1.0 | 2.0 | 4.0 | 8.0 |
| pH | 8.7 | 9.5 | 9.6 | 9.5 | 9.7 | 9.6 |
| Plastic Vis. | 16 | 16 | 17 | 19 | 19 | 21 |
| Yield Point | 1 | 6 | 0 | 6 | 0 | 8 |

TABLE 6-continued

COMPATABILITY TESTING
TLA-627
IN LIGNOSULFONATE SYSTEM

| Sample | 1 | 2 | 3 | 4 | 5 | 6 |
|---|---|---|---|---|---|---|
| Gels | | | | | | |
| 10 sec | 0[1] | 0[1] | 0[1] | 0[1] | 0[1] | 0[2] |
| 10 min | 0[1] | 0[1] | 0[1] | 0[1] | 0[1] | 0[3] |
| API Filtrate | 12.4 | 12.2 | 11.5 | 11.4 | 11.0 | 10.4 |

Base:
Q-Broxin 6 lb/bbl
Caustic Soda to pH 10 in a native solids mud (Broussard)

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

What is claimed is:

1. An aqueous drilling fluid having a pH greater than about 8, comprising:
   water
   clay solids; and
   about 0.2% to about 3% by volume of a lubrication additive comprising a polyolefin having a molecular weight of about 500 to about 2100 and having one or more substituent groups of the formula:

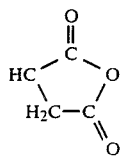

2. The fluid of claim 1, wherein the polyolefin is a polybutene.

3. The fluid of claim 1, wherein the fluid further comprises calcium hydroxide.

4. The fluid of claim 3, wherein the water is saturated with calcium hydroxide.

5. The fluid of claim 1, wherein the fluid further comprises lignosulfonates.

6. The fluid of claim 1, wherein the fluid further comprises polysaccharides which are hydrolyzed cereal solids to reduce the gel strength and yield point of the fluid.

7. The fluid of claim 1, wherein the fluid further comprises gypsum.

8. The fluid of claim 1, wherein the fluid further comprises a saturated sodium chloride brine.

9. The fluid of claim 1, wherein the fluid has a pH greater than about 12.

10. An aqueous drilling fluid having a pH greater than about 8, comprising:
    water
    about 0.3% to about 2.0% by volume of a lubrication additive;
    about 1 to about 8 lb/bbl by weight of calcium hydroxide; and
    about ⅛ to about 8 lb/bbl by weight of polysaccharides which are hydrolyzed cereal solids to reduce the gel strength and yield point of the fluid,
    said lubrication additive comprising a polybutene having a molecular weight of about 900 to about 1700 with one or more substituent groups of succinic anhydride.

11. A method of drilling wells in the earth wherein an aqueous drilling fluid with a pH greater than about 8 is circulated in the well in contact with earth formations during drilling, said fluid containing about 0.2% to about 3% by volume of a polyolefin in solution having a molecular weight of about 500 to about 2100 and having one or more substituent groups of the formula

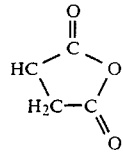

* * * * *